Aug. 15, 1967
W. J. LEITMANN
3,336,059
RESILIENT RETAINER
Filed April 13, 1965
2 Sheets-Sheet 1
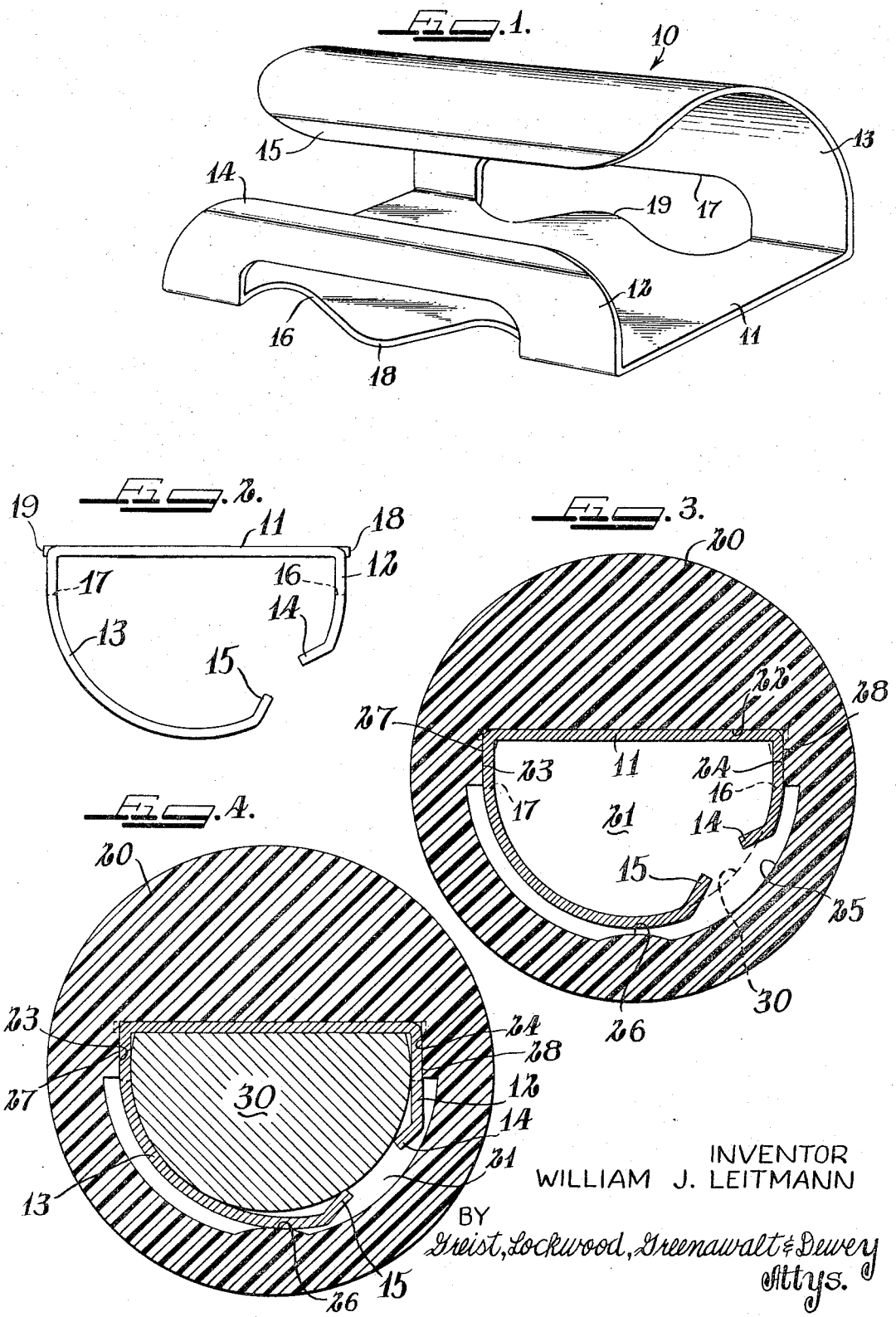
INVENTOR
WILLIAM J. LEITMANN
BY
Greist, Lockwood, Greenawalt & Dewey
Attys.

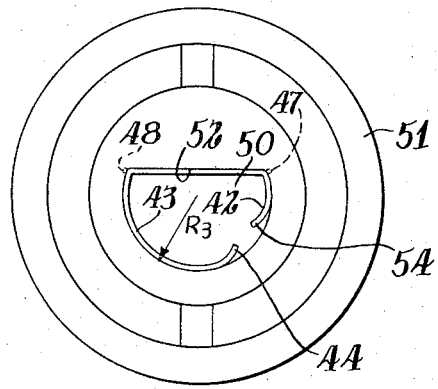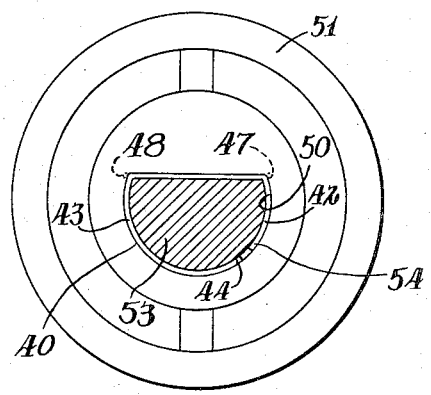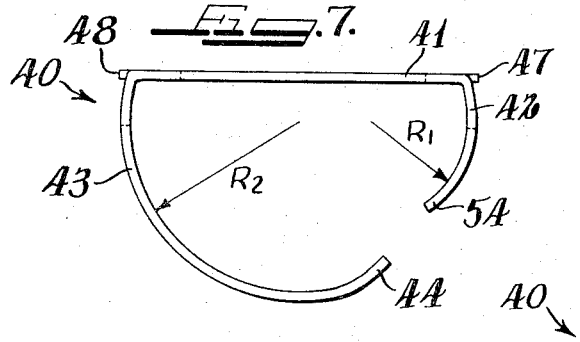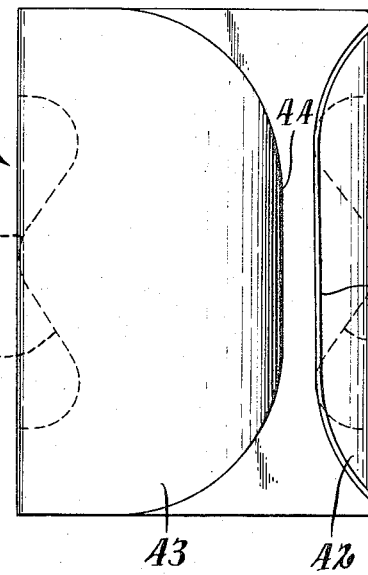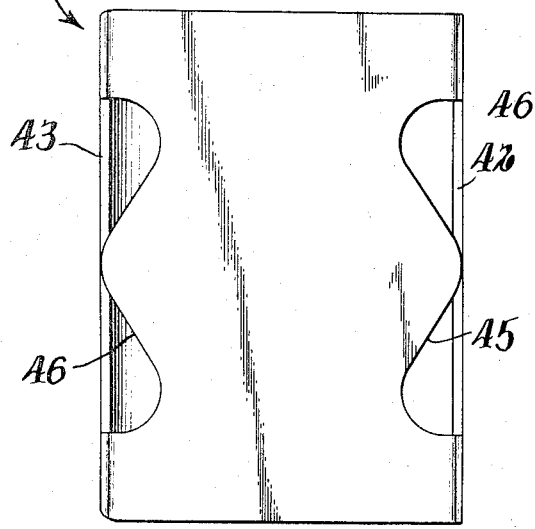

United States Patent Office 3,336,059
Patented Aug. 15, 1967

3,336,059
RESILIENT RETAINER
William J. Leitmann, Chicago, Ill., assignor to Rohden Manufacturing Company, Inc., Chicago, Ill., a corporation of Illinois
Filed Apr. 13, 1965, Ser. No. 447,798
6 Claims. (Cl. 287—53)

ABSTRACT OF THE DISCLOSURE

A resilient retainer or knob spring for releasably, but securely, joining a knob to a shaft in a backlash-free manner. The spring is of generally semicircular shape, having a flat mounting portion with two arcuate segments formed on diverse radii joined at opposite margins and having inturned terminal ends. The knob is provided with a shaft receiving bore and includes fixed pivot edges co-operating with the arcuate segments to generate substantial gripping pressure as they are urged into engagement with the shaft. Wedge portions are provided on the flat mounting portion to maintain the retainer in the knob.

---

This invention relates to an improved resilient retainer for use in securing a knob-like means including knobs, handles or the like to a shaft-like means including rods, spindles and the like, so as to hold the knob-like means to the shaft-like means against relative rotative as well as relative axial movement.

The resilient retainer of the present invention joins the knob-like means and shaft-like means in a unique manner effectively to preclude objectionable looseness, wobble, and side play or backlash therebetween while permitting separation by application of oppositely directed axial forces of unusual magnitude.

The present invention in its broadest sense concerns a resilient retainer such as a spring having a flat mounting portion with two upwardly extending generally arcuate segments each having means at their terminal ends to urge said knob-like means and shaft-like means into tight engagement for backlash free rotation. Suitable means is provided in the axial bore formed in the knob to provide a fixed pivot edge which generates substantial gripping pressure to maintain the shaft-like means secured to the knob-like means for rotation as a unit.

One of the main considerations of spring design is that of accommodating the shape of the co-operating shaft and the functional properties of the resilient portion. Improvements in leaf-type mounting spring designs have been made, however, to date a universal design which serves to fill all the several factors involved in efficient knob spring manufacture and utilization has not been developed.

Springs of the present type are stamped from untempered metal plate and formed to the appropriate shape and heat treated in order to obtain the desired degree of resilience. Care must be exercised in the design stage to provide a design capable of economical manufacture as well as to provide a final configuration which is capable of being maintained throughout the heat treatment. Ease of assembly of the retainer or spring to the knob is a further consideration which in the present invention is easily accomplished. Additional advantages will become apparent from a perusal of the objects achieved and a detailed description of the preferred embodiments which follow.

It is an object of the invention to provide a new and improved resilient retainer for mounting in a knob-like means or other suitable member for engagement with a shaft-like means received in the knob-like means, the resilient retainer being capable of economical manufacture and efficient utilization.

It is a further object of this invention to provide new and improved resilient retainer or knob spring having spring leaf portions which are capable of controlled shaping during manufacture of the spring and which function in application is to position the shaft-like means relative to the knob-like means providing a tight grip free of backlash, wobble and the like.

Still a further object of the invention is to provide a new and improved resilient retainer having as a part thereof uniquely designed spring-like shaft engaging segments co-operating with fixed pivots formed in the bore of a knob-like means which serve frictionally to interconnect the knob-like means to the shaft-like means.

Still a further object of the invention is to provide a new and improved resilient retainer spring which is easily assembled to a knob-like means and shaft-like means to provide improved gripping action.

Other objects not specifically set forth will become apparent from the following detailed description of the invention made in conjunction with the accompanying drawings wherein:

FIG. 1 is an enlarged perspective view of one form of resilient retainer or spring embodying the principles of the present invention;

FIG. 2 is an end view of the retainer of FIG. 1 on a reduced scale;

FIG. 3 is an end view of a knob-like means having the resilient retainer of the present invention inserted therein with dotted lines to indicate the position of a shaft-like means when it is inserted;

FIG. 4 is an end view similar to FIG. 3 with the shaft-like means inserted and illustrated in cross section;

FIG. 5 is an end view of a knob provided with a modified form of resilient retainer in the absence of the shaft;

FIG. 6 is the knob and resilient retainer of FIG. 5 after the shaft-like means has been inserted, the latter being illustrated in cross section; and FIG. 7 is an enlarged end view of a retainer shown in FIGS. 5 and 6;

FIGS. 8 and 9 are top and bottom plan views respectively of the resilient retainer shown in FIGS. 5–7.

FIGS. 1 and 2 illustrate the resilient retainer 10 of the present invention in its semi-cylindrical form. The resilient retainer or spring 10 is initially shaped from a flat piece of untempered metallic plate to include a relatively flat mounting portion 11 having upwardly and inwardly curling integral arcuate segments 12 and 13 extending between opposite ends of the mounting plate 11 along each marginal edge.

Each of the arcuate segments 12 and 13 is provided with sharply bent inwardly directed resilient terminal end portions 14 and 15 respectively, extending generally longitudinally of the associated segment and as best seen in FIG. 2 directed generally towards the flat mounting portion 11. Material is removed in each of the arcuate segments adjacent the mounting portion 11 to form openings 16 and 17. The mounting portion 11 includes outwardly protruding wedge-like portions 18 and 19 respectively, forming shoulders for engagement with the sides of a bore in a knob-like means as will be described more completely hereinafter.

A knob-like means is shown at 20 in FIG. 3 being illustrated in a cross sectional view taken at right angles to the central or rotational axis. The knob-like means 20 is provided with the usual bore 21 having a flat bottom 22 formed slightly off the central rotational axis. A pair of side shoulder portions 23 and 24 extend at right angles to the bottom 22 merging with an enlarged semi-circular bore 25 extending between the side shoulders 23 and 24. A fixed pivot edge 26 extends axially in the bore 21 positioned approximately 90° from each of the side shoulders 23 and 24.

The resilient retainer 10 may be forced into the bore so that straight side portions 27 and 28 are in snug engagement with the side shoulders 23 and 24. The wedge-like portions 18 and 19 may engage the side shoulders 23 and 24 if desired to hold the resilient retainer in the bore 21 of the knob-like means 20.

It can be observed that in the free state the resilient retainer 10 engages the flat bottom portion and straight side shoulders 23 and 24 of the bore 21 with the arcuate segment 13 being slightly spaced from the fixed pivot 26. The amount of interference between a shaft like means which is inserted into the bore of the knob-like means 20 can be appreciated by examination of FIG. 3 illustrating the typical contour of a flat-sided shaft-like means 30 in dotted lines. The dotted lines substantially coincide with the internal contour of the resilient retainer with the exception of the inwardly directed resilient terminal end portions 14 and 15.

When the shaft-like means 30 is inserted into the bore 21 of the knob-like means 20 as shown in the cross sectional view of FIG. 4, the inwardly directed terminal end portions 14 and 15 of the arcuate segments exert pressure continuously along the outer periphery urging the shaft-like means downwardly towards the flat bottom 22 of the bore 21 and towards the side shoulder or straight shoulder section 23. The resilient end portion 14 bends about a point or longitudinally fixed pivot on the side shoulder 24 which serves to control the direction and magnitude of the force exerted. In a similar manner, the longitudinally formed fixed pivot 26 engages the arcuate segment 13 slightly spaced from the inwardly directed resilient terminal end portion 15 to control the direction of the spring action, with the resultant forces acting to urge the shaft and knob-like means into tight engagement with the shoulder 23 and bottom 22 of the bore 21. Accordingly, before relative rotation of even slight magnitude can occur between the parts, the shaft-like means 30 must be moved against the force exerted by terminal end portions 14 and 15.

Referring now to FIGS. 7-9, a modified form of resilient retainer, or knob spring as it is sometimes called, is illustrated in end, top and bottom plan views respectively being indicated generally by the reference numeral 40. The knob spring 40 includes a flat plate-like mounting portion 41 having upstanding arcuate side portions 42 and 43 respectively. The upstanding arcuate side portion 42 is generated on a radius $R_1$ revolved about an axis parallel to and above the plate-like mounting portion slightly off to one side of the longitudinal geometric centerline. The arcuate segment 43 is formed on a radius $R_2$ revolved about an axis which is also spaced from the mounting portion 41 a perpendicular distance equal to the axis of the radius $R_1$. The axis of the radius $R_2$ however, lies on a perpendicularly disposed plane bisecting the plate-like mounting portion 41, thus providing a smooth arcuate portion, which substantially conforms to the shape of the circumferential arcuate portion of the associated flat-sided shaft. The terminal end 44 of the arcuate segment 43 is arcuately bent inwardly a slight amount from the projected path of the remainder of the arcuate segment 43 for purposes to become apparent.

Suitable cut-out portions 45 and 46 are provided in each of the arcuate segments 42 and 43 to enhance the resilience and provide good spring action. Wedge-like portions 47 and 48 may be provided at the marginal edges of the plate-like mounting portion 41, protruding a slight amount for engagement with the sides of a bore in a knob-like means which accommodates the same. As is best seen in FIG. 7, the wedge-like portions 47 and 48 project outwardly of the plate-like mounting portion 41 a slight amount to provide a wedge action with the walls of a bore, thereby releasably to hold the knob spring to the knob-like means.

As is best seen in FIG. 5, the resilient retainer or knob spring 40 may be inserted in a bore 50 provided in a knob-like means 51. The bore 50 generally conforms to the shape of the shaft-like means to be inserted being generated about a longitudinal axis $R_3$ which coincides or is coextensive with the rotational axis of the shaft to be inserted. A flat bottom 52 is formed in the bore 50 and co-operates with the plate-like mounting portion 41 to properly position the resilient retainer 40 within the bore.

When a shaft-like means indicated generally at 53 in FIG. 6 is inserted in the bore, the terminal end 44 of the arcuate segment 43 and a terminal end 54 of the arcuate segment 42 are flexed outwardly in the manner shown. Arcuate ends are formed on each of the segments 42 and 43 as is evident in FIG. 8 with this construction enhancing the ease with which the shaft 53 may be inserted, and causing the gradual expansion of the terminal ends 44 and 54.

Since the radius $R_1$ of the segment 42 is substantially less than the radius of the bore $R_3$, in the free state the terminal end 54 is spaced a slight amount from the side walls of the bore 50 in the knob-like means 51. Under similar conditions the terminal end 44 of the arcuate segment 43 is also spaced from the bore 50, since it curls inwardly approximately from a plane perpendicularly bisecting the plate-like mounting portion 41.

When the shaft-like means 53 is inserted in the bore 50 of the knob-like means 51, the resilient retainer 40 substantially envelops the shaft-like means 53. The terminal end portions 44 and 54 of the arcuate segments 42 and 43 respectively urge the shaft and knob generally towards the edge containing the wedge portion 48. Rotation of the shaft occurs about an axis which is substantially co-extensive with the axis of the bore and the axis of generation of the arcuate segment 43.

From a consideration of the foregoing it can be appreciated that the unique design of the resilient retainers of the present invention serve to establish efficient frictional engagement with a shaft-like means received in a co-operating bore. The unique action of the arcuate segments supply the requisite control and over-all spring tension necessary to prevent wobble and/or backlash. The novel retainer design and function provided in the forms described above additionally enhances the economy and efficiency in manufacture since the simplified shape may be readily imparted to the untempered metal as a result of a single stamping operation. Little or no variation in final spring leaf configuration is experienced during tempering because of the simplified design.

In the foregoing description, the retainer has been described in connection with knob-like means and shaft-like means only to efficiently outline the principles embodied in the invention. It is obvious that the resilient retainer or spring is capable of use in attaching parts which may be shaped in conformity with the description given above. For example, the grid cap may be joined to the grid terminal on a vacuum tube through the use of a spring or retainer as described above.

Obviously, certain modifications and variations of the invention as hereinbefore set forth may be made without departing from the spirit and scope of the inventive concepts embodied herein and therefore only such limitations should be imposed as are indicated in the appended claims.

I claim:

1. A resilient retainer for use in mounting a knob-like means on a shaft-like means, said resilient retainer including a generally flat mounting portion adapted for engagement with a flat portion formed on said shaft-like means and further being adapted to co-operate with a flat sided bore formed in said knob-like means, a first arcuate segment extending upwardly from a first edge of said flat mounting portion in a generally arcuate direction towards a second edge thereof and terminating short of the same, a second arcuate segment extending generally arcuately upward from said second edge portion in a direction towards said first edge portion, one of said segments being of greater arcuate length than the other of said segments so as to overlie a substantial part of said shaft-like means, and extending past the longitudinal median plane of the fastener which extends at right angles to the mounting portion, and each of said first and second segments terminating in a radially inwardly bent end formation adapted to exert downward pressure on a circumferential portion of said shaft-like means to urge it towards said flat mounting portion.

2. A resilient retainer for mounting a knob-like means on a shaft-like means, said retainer comprising a generally flat mounting portion adapted to be received between opposed flattened surfaces of said knob-like means and said shaft-like means, a first segment integral with one side of said flat mounting portion and extending upwardly therefrom in a generally arcuate path along a radius substantially conforming to the shape of the shaft-like means, said first arcuate segment extending through the median plane of the fastener extending at right angles to the mounting portion and terminating with a bent radially inwardly extending terminal end portion which in the free state is within the projected path of curvature of said shaft-like means, a second arcuate segment extending upwardly from the other side of said flat mounting portion and integral therewith, said second arcuate segment having the end portion thereof terminating short of said first arcuate segment terminal end portion and bent radially inwardly, said end portion on said second arcuate segment in the free state lying inside the projected path of said shaft-like means whereby when said shaft-like means is inserted each of said end portions exert a force thereon generally downwardly toward said flat mounting portion.

3. A resilient retainer for mounting a knob-like means on a shaft-like means, said resilient retainer comprising a generally flat mounting portion adapted to be received between opposed flattened surfaces of said knob-like means and said shaft-like means, a pair of resilient segments extending generally arcuately from said mounting portion around said shaft-like means on opposite sides thereof, each of said segments terminating in inwardly directed resilient end portions projecting generally toward said mounting portion in the free state lying out of the projected path of the shaft-like means, each of said inwardly directed end portions adapted to exert force along a longitudinal portion of the circumference of said shaft-like means thereby to urge said shaft-like means downwardly and transversely of said flat mounting portion toward said flattened surface on said knob-like means thereby to retain said shaft-like means and said knob-like means in snug fitting relation for backlash free rotation, said knob-like means including a fixed pivot edge for engagement with one of said arcuate segments on said retainer.

4. A resilient retainer for mounting a knob-like means on a shaft-like means, said resilient retainer comprising a generally flat mounting portion adapted to be received between opposed flattened surfaces of said knob-like means and said shaft-like means, a pair of resilient segments extending generally arcuately from said mounting portion around said shaft-like means on opposite sides thereof, each of said segments terminating in inwardly directed resilient end portions projecting generally toward said mounting portion in the free state lying out of the projected path of the shaft-like means, each of said inwardly directed end portions adapted to exert force along a longitudinal portion of the circumference of said shaft-like means thereby to urge said shaft-like means downwardly and transversely of said flat mounting portion toward said flattened surface on said knob-like means thereby to retain said shaft-like means and said knob-like means in snug fitting relation for backlash free rotation, each of said inwardly directed end portions being formed by a sharply bent end formation and fixed pivot edges formed in said knob-like means to control the pivoting of said end formations when said shaft-like means is inserted.

5. A resilient retainer for mounting a knob-like means on a shaft-like means, said resilient retainer comprising a generally flat mounting portion adapted to be received between opposed flattened surfaces of said knob-like means and said shaft-like means, a pair of resilient segments extending generally arcuately from said mounting portion around said shaft-like means on opposite sides thereof, each of said segments terminating in inwardly directed resilient end portions projecting generally toward said mounting portion in the free state lying out of the projected path of the shaft-like means, each of said inwardly directed end portions adapted to exert force along a longitudinal portion of the circumference of said shaft-like means thereby to urge said shaft-like means downwardly and transversely of said flat mounting portion toward said flattened surface on said knob-like means thereby to retain said shaft-like means and said knob-like means in snug fitting relation for backlash free rotation, each of said generally arcuate segments being generated on spaced radii of diverse origins spaced different distances from the longitudinal centerline of the retainer and positioned above a plane lying in said mounting portion, and with one of said radii being less than the radii forming the arcuate surface of said shaft.

6. A resilient retainer mounting a knob-like means on a shaft-like means, said resilient retainer including a generally flat mounting portion engaging a flat portion formed on said shaft-like means and also engaging a flat-sided bore formed in said knob-like means, said bore of said knob-like means being provided with at least one fixed pivot edge, a first arcuate segment extending upwardly from a first edge of said flat mounting portion in a generally arcuate direction toward the second edge thereof and terminating short of the same, a second arcuate segment extending generally arcuately upward from said second edge portion in a direction toward said first edge portion, one of said arcuate segments co-operating with said fixed pivot edge for urging the same toward said shaft-like means, and each of said first and second segments terminating in an inwardly bent end formation exerting a downward pressure on a circumferential portion of said shaft-like means to urge it toward said flat mounting portion.

References Cited

UNITED STATES PATENTS

| | | |
|---|---|---|
| 2,244,975 | 6/1941 | Tinnerman. |
| 2,541,892 | 2/1951 | Schulze. |
| 2,695,390 | 11/1954 | Woolston et al. ____ 339—258 X |
| 2,733,083 | 1/1956 | Strange _____ 287—53 |
| 2,968,504 | 1/1961 | Hansen _____ 287—53 |
| 3,130,990 | 4/1964 | Leitmann _____ 287—53 |

FOREIGN PATENTS 889,632   9/1953   Germany.

CARL W. TOMLIN, *Primary Examiner.*

A. V. KUNDRAT, *Assistant Examiner.*